(No Model.)
F. J. INGRISH.
HARNESS CRUPPER.
No. 299,793. Patented June 3, 1884.
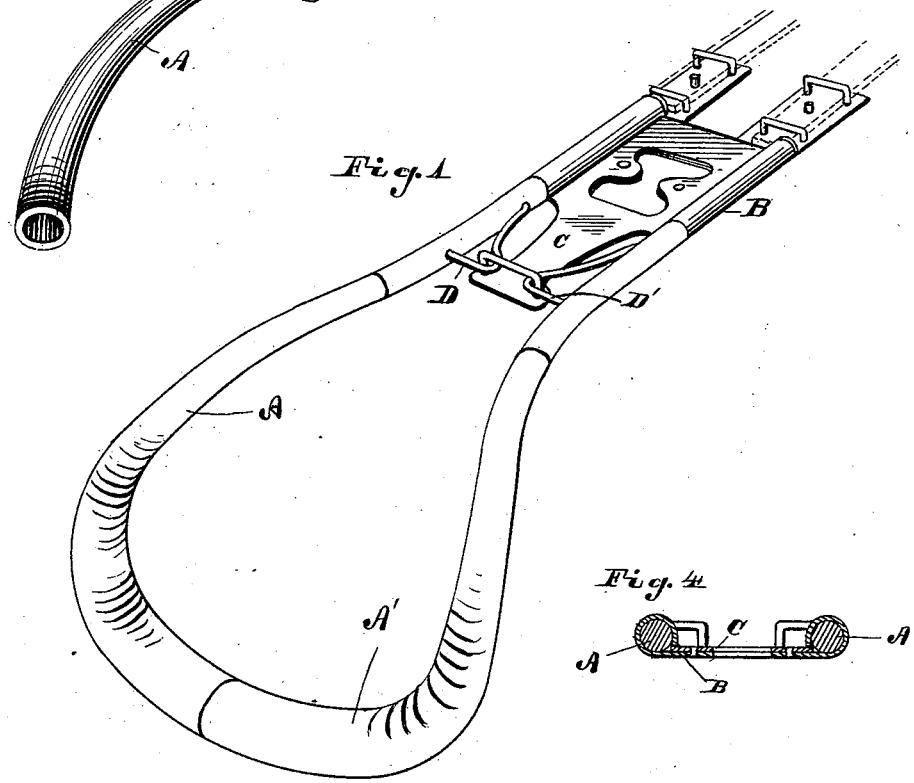
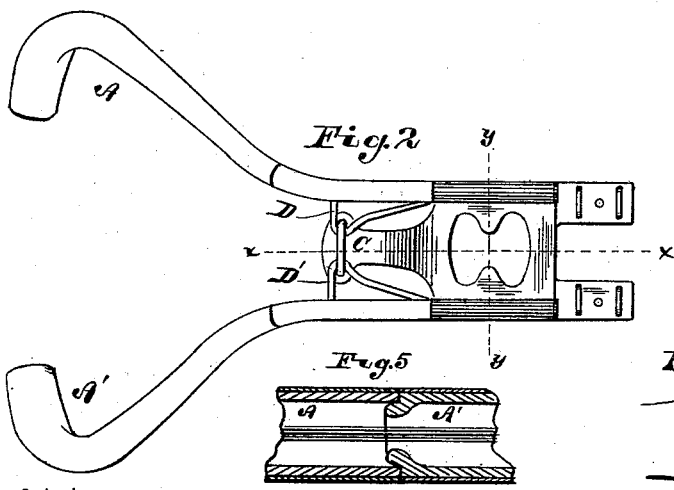

UNITED STATES PATENT OFFICE.

FERDINAND J. INGRISH, OF LIBERTYVILLE, ILLINOIS.

HARNESS-CRUPPER.

SPECIFICATION forming part of Letters Patent No. 299,793, dated June 3, 1884.

Application filed November 24, 1883. (No model.)

*To all whom it may concern:*

Be it known that I, FERDINAND J. INGRISH, a citizen of the United States, residing at Libertyville, in the county of Lake and State of Illinois, have invented a certain new and useful Improvement in Cruppers, of which the following is a full, clear, concise, and exact description, reference being had to the accompanying drawings, forming a part of this specification.

My invention relates to cruppers which are designed to pass under the tail of a horse, and which are connected with the saddle of the harness to prevent the same from working forward.

Heretofore it has been the custom to provide a buckle upon each end of the crupper, by means of which the crupper is connected with the back-strap. One end of the crupper is usually left buckled to the back-strap all the time, while the other end is buckled and unbuckled as the horse is harnessed or unharnessed. In order to bring the loop into place, it has been necessary to raise the horse's tail with one hand and carry the loop around under with the other. Other forms have been made. In one of these with which I am familiar the loop is made large and is permanently attached to the back-strap, and in order to harness the horse it has been necessary to draw the horse's tail through the loop. It has also been suggested to divide the loop in the center and provide a clasp above for holding the two parts of the loop; but the clasp was found insufficient to hold the two parts together, and much less convenient in operation than either of the forms hereinbefore described.

My invention consists in providing mechanism which may be readily operated to separate the two parts, and in so forming the two opposite ends of the two parts that they may be securely held together.

My device is illustrated in the accompanying drawings, in which Figure 1 is a perspective view showing the two parts locked together and held in place by the spring mechanism. Fig. 2 is a plan view showing the two parts separated by pressure, preferably of the thumb, upon the spring. Fig. 3 is a section thereof upon line $x\,x$. Fig. 4 is a section upon line $y\,y$. Figs. 5 and 6 are detail views of some of the parts referred to hereinafter.

Like parts are indicated by similar letters of reference throughout the several views.

The loop is divided into two parts, A and A', which are journaled to the plate B, as shown. The metallic core or frame of the loop is preferably hollow, and preferably enlarged at the rear.

As shown in Fig. 5, I have so formed the opposing ends of the loop that one end may slip into the other, and thus be held closely together by the tension of the spring C. When thus held together, as shown in Fig. 1, it is evident that the two parts cannot be separated at the rear by any force applied to the back-strap, since the two parts can only be separated when turned in the journals. The ears or wires D D' are provided as shown. By pressing down upon the spring C, these ears act as levers and the two parts of the loop are thus turned inwardly, and thereby separated sufficiently to admit the horse's tail between them, as shown in Fig. 2. In Fig. 3 the spring C is shown thus depressed.

In Fig. 4 I have shown a section of the plate B, the edges of which are turned up so as to inclose the journals of the metallic core. This core is covered, preferably, with a single thickness of leather or rubber to within about three-fourths of an inch of the spring. The remaining portion thereof and the spring and plate being preferably plated with any suitable metal. This leather or rubber covering of the loop I secure by pinching the edges thereof together between the edges of the core, as shown in Fig. 6. This I accomplish by placing the loop in a die and applying pressure.

I have devised a machine for doing this work, upon which I intend to make application for a patent.

Having thus described my invention, I claim as new and desire to secure by Letters Patent—

1. In a harness-crupper, the combination, substantially as hereinbefore set forth, of the loop, divided as described, with the plate to which the two parts of the frame of the loop are journaled, the flat spring attached to said plate, and means whereby the spring, when depressed, turns the said part of the frame in opposite directions, thereby separating the two parts of the loop, substantially as and for the purpose specified.

2. The combination, in a crupper, the loop divided in two parts, of the spring adapted to turn the two parts in opposite directions, and means, substantially as described, between the two opposite ends of said divided loop, for locking the two parts together, substantially as and for the purpose specified.

3. The combination, with the metallic core divided in two parts, of the covering pinched between the edges thereof, substantially as shown and described.

4. The combination, with the parts A A' journaled to the plate B, of spring C and ears D D', substantially as and for the purpose set forth.

5. The two parts A A' of a harness-crupper journaled on the plate B, and adapted to be turned together so as to form the loop, substantially as set forth.

In witness whereof I hereunto subscribe my name this 19th day of November, A. D. 1883.

FERDINAND J. INGRISH.

Witnesses:
PAUL A. STALEY,
GEORGE P. BARTON.